United States Patent
Ernvik et al.

(10) Patent No.: US 8,041,129 B2
(45) Date of Patent: Oct. 18, 2011

(54) IMAGE DATA SET COMPRESSION BASED ON VIEWING PARAMETERS FOR STORING MEDICAL IMAGE DATA FROM MULTIDIMENSIONAL DATA SETS, RELATED SYSTEMS, METHODS AND COMPUTER PRODUCTS

(75) Inventors: Aron Ernvik, Linköping (SE); Staffan Bergström, Vreta Koster (SE); Claes Lundström, Linköping (SE); Patric Ljung, Linköping (SE); Anders Ynnerman, Norrköping (SE)

(73) Assignee: Sectra AB, Linkoping (SE)

( * ) Notice: Subject to any disclaimer, the term of this patent is extended or adjusted under 35 U.S.C. 154(b) by 1300 days.

(21) Appl. No.: 11/613,447

(22) Filed: Dec. 20, 2006

(65) Prior Publication Data

US 2007/0269117 A1    Nov. 22, 2007

Related U.S. Application Data

(60) Provisional application No. 60/747,332, filed on May 16, 2006.

(51) Int. Cl.
*G06K 9/36* (2006.01)
(52) U.S. Cl. .......... 382/232; 382/128; 382/300
(58) Field of Classification Search .......... 382/128–132, 382/232–254, 300–302
See application file for complete search history.

(56) References Cited

U.S. PATENT DOCUMENTS

| | | | |
|---|---|---|---|
| 5,113,357 A | 5/1992 | Johnson et al. | 345/424 |
| 5,381,518 A | 1/1995 | Drebin et al. | 345/424 |
| 5,410,250 A | 4/1995 | Brown | 324/309 |
| 5,861,891 A | 1/1999 | Becker | 345/619 |
| 5,917,937 A | 6/1999 | Szeliski et al. | 382/154 |
| 5,930,803 A | 7/1999 | Becker et al. | 707/104.1 |
| 5,960,435 A | 9/1999 | Rathmann et al. | 707/101 |
| 5,986,662 A | 11/1999 | Argiro et al. | 345/424 |
| 6,008,813 A | 12/1999 | Lauer et al. | 345/424 |
| 6,026,399 A | 2/2000 | Kohavi et al. | 707/6 |
| 6,034,697 A | 3/2000 | Becker | 345/606 |
| 6,078,332 A | 6/2000 | Ohazama | 345/426 |
| 6,115,486 A * | 9/2000 | Cantoni | 382/128 |
| 6,137,499 A | 10/2000 | Tesler | 345/440 |
| 6,166,742 A | 12/2000 | He | 345/421 |
| 6,182,058 B1 | 1/2001 | Kohavi | 706/45 |
| 6,191,789 B1 | 2/2001 | Yamato et al. | 345/424 |
| 6,191,791 B1 | 2/2001 | Dyer et al. | 345/581 |

(Continued)

FOREIGN PATENT DOCUMENTS

WO    WO2005/104037 A2    11/2005

OTHER PUBLICATIONS

Adobe Systems Incorporated "Adobe® Photoshop® 6.0 User Guide" 16-17 (2000).

(Continued)

*Primary Examiner* — Manav Seth
(74) *Attorney, Agent, or Firm* — Myers Bigel Sibley & Sajovec, P.A.

(57) ABSTRACT

Methods for electronically compressing data from a multidimensional medical data set for long-term storage includes: (a) generating a first medical image from a patient multi-dimensional medical image data set in a short-term storage format; and (b) compressing the patient medical image data set into a long-term storage format using at least one viewing parameter.

14 Claims, 11 Drawing Sheets

U.S. PATENT DOCUMENTS

| | | | | |
|---|---|---|---|---|
| 6,219,059 B1 | 4/2001 | Argiro | | 345/424 |
| 6,219,061 B1 | 4/2001 | Lauer et al. | | 345/424 |
| 6,259,451 B1 | 7/2001 | Tesler | | 345/419 |
| 6,261,233 B1 | 7/2001 | Kantorovich | | 600/454 |
| 6,262,740 B1 | 7/2001 | Lauer et al. | | 345/424 |
| 6,278,459 B1 | 8/2001 | Malzbender et al. | | 345/424 |
| 6,278,464 B1 | 8/2001 | Kohavi et al. | | 345/440 |
| 6,301,579 B1 | 10/2001 | Becker | | 707/102 |
| 6,373,483 B1 | 4/2002 | Becker et al. | | 345/419 |
| 6,407,737 B1 | 6/2002 | Zhao et al. | | 345/424 |
| 6,460,049 B1 | 10/2002 | Becker et al. | | 707/104.1 |
| 6,480,194 B1 | 11/2002 | Sang'udi et al. | | 345/440 |
| 6,539,127 B1 | 3/2003 | Roche et al. | | 382/294 |
| 6,556,696 B1 | 4/2003 | Summers et al. | | 382/128 |
| 6,559,843 B1 | 5/2003 | Hsu | | 345/421 |
| 6,585,647 B1 | 7/2003 | Winder | | 600/437 |
| 6,647,283 B2 | 11/2003 | Klotz | | 600/425 |
| 6,664,961 B2 | 12/2003 | Ray et al. | | 345/424 |
| 6,674,430 B1 | 1/2004 | Kaufman et al. | | 345/419 |
| 6,694,163 B1 | 2/2004 | Vining | | 600/407 |
| 6,714,195 B1 | 3/2004 | Ezra et al. | | 345/423 |
| 6,771,262 B2 | 8/2004 | Krishnan | | 345/424 |
| 6,771,263 B1 | 8/2004 | Behrens et al. | | 345/424 |
| 6,798,412 B2 | 9/2004 | Cowperthwaite | | 345/428 |
| 6,801,215 B1 | 10/2004 | Silva et al. | | 345/629 |
| 6,806,705 B2 | 10/2004 | van Muiswinkel et al. | | 324/320 |
| 6,842,176 B2 | 1/2005 | Sang'udi et al. | | 345/440 |
| 6,967,653 B2 | 11/2005 | Wittenbrink et al. | | 345/440 |
| 7,079,140 B2 | 7/2006 | Boehler et al. | | 345/440 |
| 7,123,763 B2 | 10/2006 | Shinbata | | 382/132 |
| 7,209,592 B2* | 4/2007 | Keller et al. | | 382/240 |
| 7,536,644 B2* | 5/2009 | Fowkes et al. | | 715/720 |
| 2001/0031920 A1 | 10/2001 | Kaufman et al. | | 600/431 |
| 2002/0183606 A1 | 12/2002 | Boehler et al. | | 600/407 |
| 2003/0009098 A1 | 1/2003 | Jack et al. | | 600/410 |
| 2003/0053668 A1 | 3/2003 | Ditt et al. | | 382/128 |
| 2003/0176780 A1 | 9/2003 | Arnold et al. | | 600/407 |
| 2004/0013292 A1 | 1/2004 | Raunig | | 382/128 |
| 2004/0062429 A1 | 4/2004 | Kaufhold | | 382/132 |
| 2004/0064038 A1 | 4/2004 | Bruder et al. | | 600/425 |
| 2004/0184647 A1 | 9/2004 | Reeves et al. | | 382/131 |
| 2004/0210130 A1 | 10/2004 | Prince | | 600/420 |
| 2004/0259065 A1 | 12/2004 | Geiger | | 434/272 |
| 2005/0017972 A1 | 1/2005 | Poole et al. | | 345/424 |
| 2006/0066628 A1 | 3/2006 | Brodie et al. | | 345/594 |
| 2006/0088198 A1 | 4/2006 | Arnold | | 382/131 |
| 2007/0013696 A1 | 1/2007 | Desgranges et al. | | 345/426 |
| 2007/0019849 A1 | 1/2007 | Kaufman et al. | | 382/128 |
| 2008/0021740 A1* | 1/2008 | Beane et al. | | 705/3 |

OTHER PUBLICATIONS

Andriole, K.P., *Addressing the Coming Radiology Crisis: The Society for Computer Applications in Radiology Transforming the Radiological Interpretation Process (TRIP™) Initiative*, A position paper from the SCAR TRIP™ subcommittee. http://www.scarnet.org/pdf/2TRIPwhitepaper103.pdf, Nov. 2003.

Bajaj et al., *The Contour Spectrum*, In Proceedings IEEE Visualization, pp. 167-173, (1997).

Biegler et al. *A Parametric Analysis Study on the Number of Materials Required for a Convergence of Finite Element Results for a Tibial Bone Model*, Department of Mechanical Engineering, University of Wisconsin-Madison, Madison, WI, presented at 14th Annual Symposium on Computational Methods in Orthopaedic Biomechanics, Chicago, IL (2006).

Drebin et al. *Volume Rendering* Computer Graphics 22(4):65-74 (1988).

Guthe et al. *Interactive Rendering of Large Volume Data Sets*, to appear in Proceedings IEEE Visualization 53-60 (2002) [pre-publication version (8 pages).

He et al., *Generation of transfer functions with stochastic search techniques*, In Proceedings IEEE Visualization, pp. 227-234, (1996).

Hladuvka, J. et al., *Curvature-based transfer functions for direct volume rendering*, In Proceedings Spring Conference Computer Graphics 2000, vol. 16, pp. 58-65, (2000).

Huffman, et al., *A Method for the Construction of Minimum-Redundancy Codes* Proceedings of the I.R.E. 40(9):1098-1101 (1952).

Kindlmann, G. et al., *Curvature-based transfer functions for direct volume rendering: Methods and applications*, IEEE Visualization 2003, pp. 513-520, (2003).

Kindlmann, G. et al., *Semi-automatic generation of transfer functions for direct volume rendering*, In Proceedings IEEE Symposium on Volume Visualization, pp. 79-86, (1998).

Kniss, J. et al., *Multidimensional transfer functions for interactive volume rendering*, IEEE Transactions on Visualization and Computer Graphics, vol. 8, No. 3, pp. 270-285, (2002).

Konig, A.H. et al., *Mastering transfer function specification by using VolumePro technology*, In Proceedings Spring Conference Computer Graphics 2001, vol. 17, pp. 279-286, (2001).

Laidlaw, D. et al., *Partial-volume Bayesian classification of material mixtures in MR volume data using voxel histograms*, IEEE Transactions on Medical Imaging, vol. 17, No. 1, pp. 74-86, (1998).

Lamar, E. et al., *Efficient Error Calculation for Multiresolution Texture-based Volume Visualization*, The Workshop on Hierarchical Approximation and Geometrical Methods for Scientific Visualization, Tahoe City, California (2001) pp. 3-11.

Levoy, M. et al., *Volume Rendering, Display of surfaces from volume data*, IEEE Computer Graphics and Applications, vol. 8, No. 5, pp. 29-37, (1988).

Ljung, P. et al., *Transfer function based adaptive decompression for volume rendering of large medical data sets*, In Proceedings IEEE Volume Visualization and Graphics Symposium, pp. 25-32, (2004).

Lum, E.B. et al., *Lighting transfer functions using gradient aligned sampling*, IEEE Visualization 2004, pp. 289-296, (2004).

Lundstrom et al., *Extending and Simplifying Transfer Functin Design in Medical Volume Rendering Using Local Histograms*, Eurographics-IEEE VGTC Symposium on Visualization, 8 pages, (Jun. 2005).

Maragos, P. et al., *Morphological systems for multidimensional signal processing*, Proceedings of the IEEE, vol. 78, No. 4, pp. 690-710, (1990).

Marks, J. et al., *Design galleries: A general approach to setting parameters for computer graphics and animation*, In Proceedings SIGGRAPH 1997, pp. 389-400, (1997).

Materialise "Mimics" program description, 1 page (2006) http://www.materialise.com/_mimics/main_ENG.html.

Nyul et al., *On standardizing the MR Image Intensity Scale*, Magnetic Resonance in Medicine 42:1072, pp. 1072-1081, (1999).

Pfister, H. et al., *The transfer function bake-off*, In Proceedings of the IEEE Visualization 2001, pp. 16-22, (2001).

Sato, Y. et al., *Tissue classification based on 3D local intensity structures for volume rendering*, IEEE Transactions on Visualization and Computer Graphics, vol. 6, No. 2, pp. 160-179, (2000).

Tzeng, F.Y. et al., *A novel interface for higher-dimensional classification of volume data*, In Proceedings IEEE Visualization 2003, pp. 505-512, (2003).

Zoroffi, R.A. et al., *Automated segmentation of acetabulum and femoral head from 3-D CT images*, IEEE Transactions on Information Technology in Biomedicine, vol. 7, No. 4, pp. 329-343, (Dec. 2003).

*Voluming Rendering Overview*, http://www.tgs.com/pro_div/vol_render_overview.htm, 3 Sheets, Copyright TGS 2004.

*Announcement of 7th Symposium, Eurographics/IEEE VGTC Symposium on Visualization*, (scheduled for Jun. 1-3, 2005) http://www.comp.leed.ac.uk/eurovis/index.html, 2 sheets, believed to be Dec. 2004.

* cited by examiner

IMAGE DATA SET COMPRESSION BASED ON VIEWING PARAMETERS FOR STORING MEDICAL IMAGE DATA FROM MULTIDIMENSIONAL DATA SETS, RELATED SYSTEMS, METHODS AND COMPUTER PRODUCTS

RELATED APPLICATIONS

This application claims the benefit of priority of U.S. Provisional Patent Application Ser. No. 60/747,332, filed May 16, 2006, the contents of which are hereby incorporated by reference as if recited in full herein.

FIELD OF THE INVENTION

The present invention relates to visualization of medical images generated from multidimensional medical data sets.

BACKGROUND OF THE INVENTION

Data sets routinely captured in medical imaging are rapidly increasing in size due to improved geometric resolution and decreased examination times in state of the art imaging modalities, such as, for example, Computed Tomography (CT) and Magnetic Resonance Imaging (MRI). One undesired consequence of the increased data set size is increased storage space requirements. A common solution to decrease storage space is to lower the resolution of the stored data. A typical data set with lower resolution is an image volume represented as a number of 2-D slices. Saving space by lowering resolution can translate to merging groups of slices, dramatically reducing the number of slices. This data reduction can be carried out at different points in time, for example in connection with actual examination or later, such as about 6-months later, when the images are less likely to be viewed again.

Unfortunately, saving storage space using lower resolution data sets can reduce image quality. Thus, whenever the images are viewed in reduced form, clinical information can be lost that may be potentially important for patient evaluation and/or treatment. Findings from "full quality" resolution images may be impossible or difficult to evaluate in lower resolution, which can make comparisons to subsequent "new" examinations difficult. In addition, it may be difficult to re-evaluate an earlier questionable or potentially uncertain diagnosis or finding based on the earlier examination image, potentially resulting in false assumptions of information on patient history being used as a basis for a patient's current treatment.

Known two-dimensional (2-D) and three-dimensional (3-D) visualization products provide medical images that can render images from stored electronic data files. The data input used to create the image renderings can be a stack of image slices from a desired imaging modality, for example, a CT or MRI modality. The visualization can convert the image data into an image volume to create renderings that can be displayed on a workstation display.

Slice-by-slice viewing of medical data may be increasingly difficult for the large data sets now provided by imaging modalities, raising issues of information and data overload and clinical feasibility with current radiology staffing levels. See, e.g., *Adressing the Coming Radiology Crisis: The Society for Computer Applications in Radiology Transforming the Radiological Interpretation Process (TRIP™) Initiative*, Andriole et al., at URL scarnet.net/trip/pdf/TRIP_White_Paper.pdf (November 2003). In some modalities, patient data sets can have large volumes, such as greater than 1 gigabyte, and can even commonly exceed 10's or 100's of gigabytes, hence terabytes of data in a patient multi-dimensional data set is becoming more common.

The diagnostic task of a clinician such as a radiologist can vary patient to patient and, accordingly so can the desired renderings or views of the medical images of the patient. In some visualization systems, a physician uses an interactive workstation that has a data retrieval interface that obtains the medical data for medical image renderings from electronic volume data sets to generate desired medical representations. Image visualizations using the multi-dimensional image data can be carried out using any suitable system such as, for example, PACS (Picture Archiving and Communication System). PACS is a system that receives images from the imaging modalities, stores the data in archives, and distributes the data to radiologists and clinicians for viewing (and can refer to sub portions of these systems).

The lower resolution noted above that has been used to decrease storage space requirements can be particularly relevant for 3-D rendering methods such as Direct Volume Rendering (DVR). In DVR, low resolution can result in jagged contours of anatomical features, negatively impacting diagnostic image quality. As the data sets increase in size, the traditional slice-by-slice viewing can become less efficient and DVR may become a valuable routine clinical tool for generating medical images.

Despite the above, there remains a need for alternate techniques to format multi-dimensional data sets of medical images for storage and/or retrieval.

SUMMARY OF EMBODIMENTS OF THE INVENTION

Embodiments of the present invention are directed to methods, systems and computer program products that can compress image data for long-term storage in a format that does not unduly compromise image quality and/or resolution for image features of interest. The compression may be based on one or more defined viewing parameters.

In some embodiments, the invention can compress or reduce image data for storage without reducing and/or significantly impacting subsequent image quality of clinically relevant features in the image, at least for some image views/viewing parameters.

In particular embodiments, methods and systems can store two versions of a patient data set: (1) a first version of a patient image data set highly compressed through the viewing parameters and (2) a second version of the patient image data set with less severe compression (such as a conventional stored version) (which may or may not have lower image quality).

Some embodiments are directed to methods for electronically compressing data from a multidimensional medical data set for long-term storage. The methods include: (a) generating a first medical image from a patient multi-dimensional medical image data set (e.g., a 2-D, 3-D volumetric, or n-D data set) in a short-term storage format; and (b) compressing the patient medical image data set into a long-term storage format using at least one viewing parameter.

In some embodiments, the method may also include displaying a medical image rendered using the patient data set in the long-term storage format after the compressing step.

In some embodiments, the at least one viewing parameter used to form the compressed data set can be used to define non-relevant data that is electronically discarded during the compressing step. The at least one viewing parameter may include at least one of a grayscale window defining non-relevant substantially constant intensity values that are discarded and/or a transfer function defining low opacity data that is discarded. The at least one viewing parameter may also include a time-dimension parameter for time-series images.

Some embodiments are directed to systems for generating DVR medical images. The systems include a volume rendering medical image processor system configured to generate: (a) first diagnostic medical images of target region of respective patients using a first short-term multi-dimensional data set, and (b) second diagnostic medical images of target region of respective patients using a second long-term multi-dimensional data set, wherein the second data set format is compressed based on at least one viewing parameter associated with visualization of the first medical images.

In particular embodiments, automated system for obtaining, archiving and generating DVR medical images can be combined with the systems for generating DVR medical images. The combined system can include: (a) a data capture circuit for electronically providing patient medical data obtained from a patient imaging modality; (b) short-term electronic storage media for electronically storing the short-term patient medical data in communication with the data capture circuit and the image processor system; and (c) long-term electronic storage media for electronically storing the short-term patient medical data in communication with the image processor circuit.

In some embodiments, the image processor system can be configured to accept physician interaction to electronically generate medical images in generally real-time responsive to physician input.

Still other embodiments are directed to systems for visualizing images of medical volume data sets. The systems include: (a) an image processor circuit configured to render (1) a first direct volume rendering medical image from a voxel medical data set temporally proximate to a first examination period using a first short-term data set and (2) a second direct volume rendering medical image temporally spaced apart from the first examination period using a compressed version of the first data set. The compressed version is generated using viewing parameters associated with the rendered first image. The systems also include at least one clinician workstation in communication with the processor configured to display the medical images.

Other embodiments are directed to computer program products. The computer program product includes a computer readable storage medium having computer readable program code embodied in the medium. The computer-readable program code includes: (a) computer readable program code configured to generate first diagnostic medical images of target region of respective patients using a first short-term multi-dimensional data set; and (b) computer readable program code configured to compress the first short-term data set into a smaller second long-term multi-dimensional data set based on at least one viewing parameter associated with visualization of the first medical images.

It is noted that any of the features claimed with respect to one type of claim, such as a system, apparatus, or computer program, may be claimed or carried out as any of the other types of claimed operations or features.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
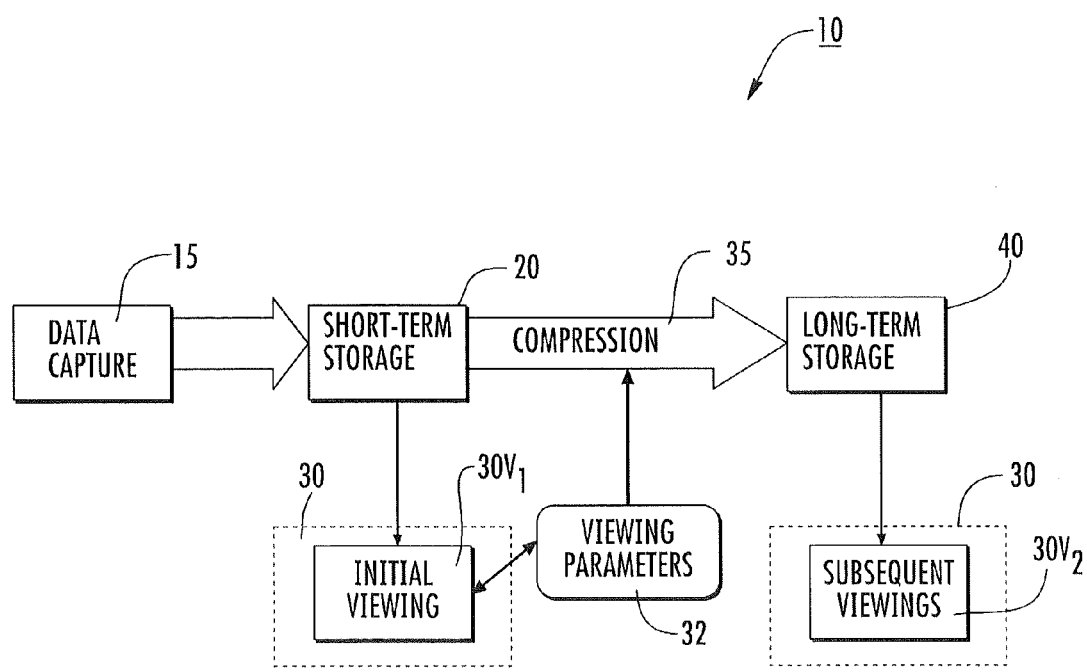
FIG. 1 is a schematic diagram of a visualization configuration and/or process that can be used to store image data and render and display medical images.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. In the claims, the claimed methods are not limited to the order of any steps recited unless so stated thereat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The term "Direct Volume Rendering" or DVR is well known to those of skill in the art. DVR comprises electronically rendering a medical image directly from data sets to thereby display visualizations of target regions of the body, which can include color as well as internal structures, using multi-dimensional 3D or 4D or more dimensional data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

Also, although embodiments of the present invention are directed to DVR of medical images, other 3-D image generation techniques and other 3-D image data may also be used. That is, the 3-D images with respective visual characteristics or features may be generated differently when using non-DVR techniques. The term "high precision" means that the image data closely corresponds to the original data. The term "image quality" in a medical image context refers to diagnostically relevant content in the rendered image. High quality means that important anatomical and/or functional features are shown at as high precision as the resolution of the original data set permits. Thus, a compression retaining image quality means that a rendering has the same or substantially the same precision in diagnostically important features as the original data.

The term "automatically" means that the operation can be substantially, and typically entirely, carried out without human or manual input, and is typically programmatically directed or carried out. The term "electronically" includes both wireless and wired connections between components. The term "compressed" and derivatives thereof refer to electronically formatting or configuring data sets to have a reduced data storage size (less bits per data set point on average). Some points may correspond to a small fraction of a bit, whereas others may have the original number of bits (or even more). The long-term storage compressed data set can be at least about 40% smaller (1:2.5 compression ratio) in bit space requirements than a corresponding original data set for lossless compression of medical data sets (where the original data can be exactly restored). For lossy compression (where the original data cannot be exactly restored) where the compression goal is to minimize the amount of error introduced, ratios of 1:40 (97.5% smaller) may be used, although ratios of 1:100 (99% smaller) may also be used. Typically, however, it is contemplated that the long-term storage compressed data set will be compressed to be about 90% smaller with a compression ratio of about 1:10.

The term "discarded" means that the affected bit(s) per data set point are electronically omitted, ignored, not selected and/or erased from a compressed version of the data set. The term "non-relevant" refers to data that does not contribute to diagnostic features and/or clinical evaluation of patient images. The term "significant" refers to data that does contribute to diagnostic features and/or clinical evaluation of patient images.

The term "transfer function" means a mathematical conversion of volume data to color and opacity values used to generate image data. The term "low opacity" refers to substantially transparent data defined by a transfer function, typically data having opacity values of less than about 0.1 on a 0.0 to 1.0 scale, and more typically at about 0.0. The phrase "short term" refers to a relatively brief evaluation period, typically less than about 6 months, during which time patient medical data sets are held for clinician review. The phrase "long-term" refers to electronic storage of the medical data sets after initial or first review and/or after about 3 months, typically at about 6 months or later, for subsequent evaluation or future electronic retrieval to allow subsequent clinical evaluation and/or comparison with a "new" medical image. The term "storage" refers to electronic storage of the medical multi-dimensional (e.g., 2-D, 3-D volumetric or higher order multi-dimensional (n-D)) imaging data in a computer readable electronic storage medium in a local and/or remote location, such, as for example, a dedicated medical record server including one server or a plurality of servers, such as, for example, a "short term storage server" and/or a "long-term storage" server. The long-term storage may be configured to transfer very aged records, such as records greater than 3-5 years old to another even longer-term storage record server. The older records may be electronically transferred based on a defined record history protocol such as a last date of access to a patient record or based on a FIFO or date-in protocol.

The term "clinician" means physician, radiologist, physicist, or other medical personnel desiring to review medical data of a patient. The term "tissue" means blood, cells, bone and the like. "Distinct or different tissue" or "distinct or different material" means tissue or material with dissimilar density or other structural or physically characteristic. For example, in medical images, different or distinct tissue or material can refer to tissue having biophysical characteristics different from other (local) tissue. Thus, a blood vessel and spongy bone may have overlapping intensity but are distinct tissue. In another example, a contrast agent can make tissue have a different density or appearance from blood or other tissue.

Visualization means to present medical images to a user/clinician for viewing. The visualization can be in a flat 2-D and/or in 2-D what appears to be 3-D images on a display, data representing features with different visual characteristics such as with differing intensity, opacity, color, texture and the like. The images as presented by the visualization do not have to be the same as the original construct (i.e., they do not have to be the same 2-D slices from the imaging modality). Two common visualization techniques (apart from viewing original slices) are Multiplanar Reconstruction (MPR), which shows an arbitrary oblique slice through the anatomy and Maximum Intensity Projection (MIP) where a slab is visualized by displaying the maximum value "seen" from each image pixel. For MPR, there are a number of variants, the slice can be thin or constructed by averaging a thicker slab, etc. . . . The images can be still images or cine (loop) images.

The term "similar examination type" refers to corresponding anatomical regions or features in images having diagnostic or clinical interest in different data sets corresponding to different patients (or the same patient at a different time). For example, but not limited to, a coronary artery, organs, such as the liver, heart, kidneys, lungs, brain, and the like.

A data set can be defined as a number of grid points in G dimensions, where there is V number of values in each grid point. The term "multi-dimensional" refers to both components, grid G and variates V, of the data sets. For data sets having a V≧1, the data set is referred to as multi-variate. Examples: a normal medical data set has G=3 and V=1, a normal time-dependent volume has G=4 and V=1, a volume describing flow will have G=3 and V=3 (three values, since the velocity is a 3D vector). The data sets of the instant invention for medical images will typically have G and V values of: G≦4 and V≦6.

In some embodiments of the description that follows, a client-server setup is illustrated, but the image processor, compression module rendering module and/or data retrieval interface(s) contemplated by the instant invention may be implemented within one computer as well, or within or shared between multiple computers in various different configurations known to those of skill in the art. The term "client" will be used both to denote a computer and the software (application) running on the computer. Additional computers can be used including more than one server and/or more than one client for a workstation or storage. For example, the server can be more than one server with different functions carried out by or between different servers. Thus, the image processor, rendering, compression and/or patient data storage modules or circuits can be on one or more separate servers and/or on clients and servers.

Turning now to FIG. 1, a visualization system 10 is illustrated. As shown, the system 10 is configured to hold captured image data 15 in short-term storage media 20. Patient image data form the short-term storage media 20 can be accessed by initial viewing 30$v_1$ at a clinician workstation/client 30. The viewing can be via a hard copy generated by a printer onto film or other media or directly or indirectly onto a screen/display of an electronic device. During evaluation of the images from the short-term storage data set, viewing parameters 32 associated with one or more images displayed can be determined and/or may be preset based on examination type and/or clinician preferences (which may be stored according to log-on identification or workstation). There are several suitable viewing parameters that may be used to discard data in the patient data set (thereby reducing and/or compressing the data set) without undue visualization (quality) impact on the visualized image as will be discussed further below. In any event, the system 10 can be configured to compress the data set used in the initial evaluation and format into a long-term compressed data set format for long-term storage 40. A clinician can subsequently view images 30$v_2$ generated from the long-term compressed patient data set 40. The later viewing can be at the same workstation 30 and/or at a different workstation, local or remote from the first workstation. The long-term storage data set 40 can comprise a relatively high-precision data set that can be used to generate DVR images. At least some of the images generated from the compressed data set in the subsequent viewing can have substantially the same quality and/or resolution as the images in the initial viewing even though the original viewed data set has compressed.

Figure 2:
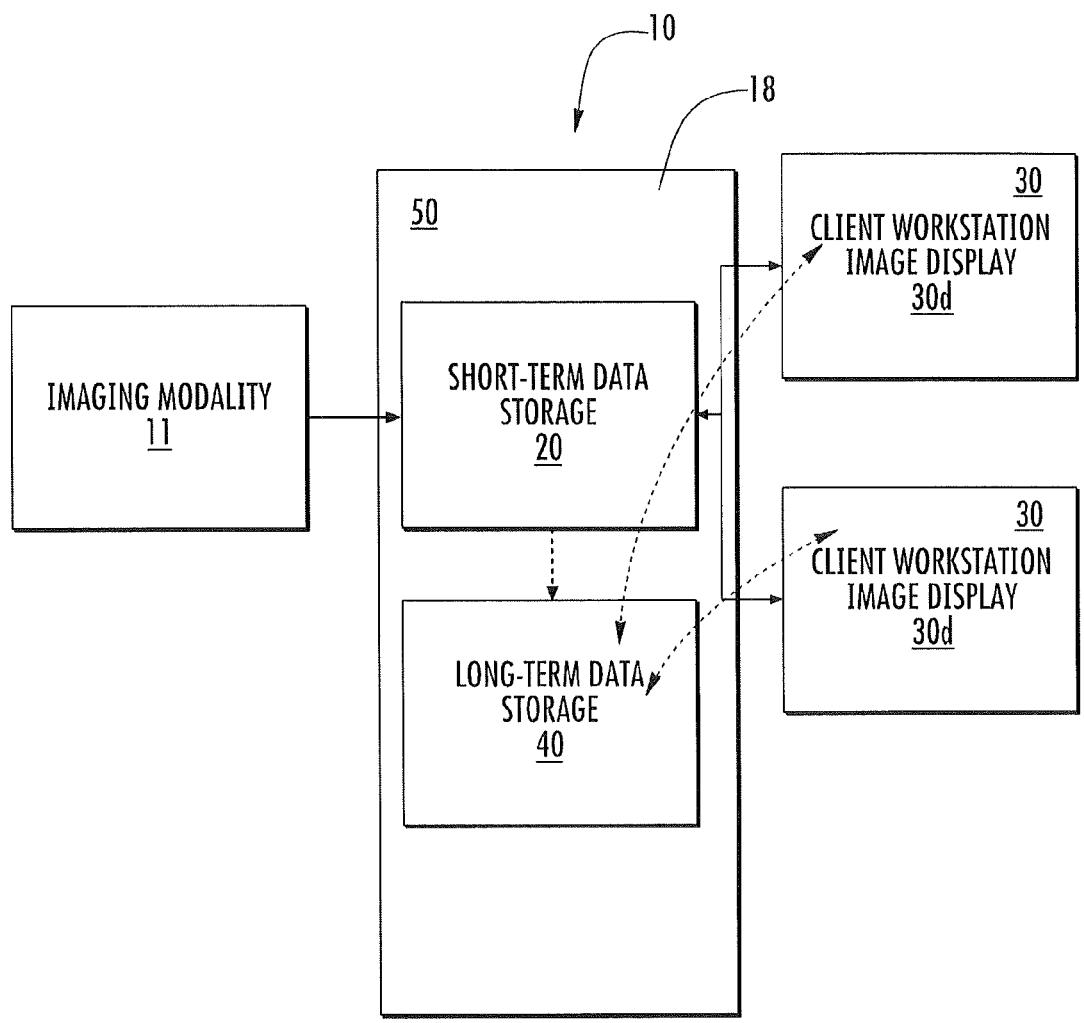
FIG. 2 is a schematic illustration of a medical imaging visualization system such as a PACS according to embodiments of the present invention.

As shown in FIG. 2, the visualization system 10 can be in communication with at least one imaging modality 11 that electronically obtains respective volume data sets of patients and can electronically transfer the data sets to the electronic storage 20. The imaging modality 11 can be any desirable modality such as, but not limited to, NMR, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both CT and MRI volume image data). In some embodiments, the system 10 may optionally combine image data sets generated from different imaging modalities 11 to generate a combination image for a patient.

The visualization system 10 can be an image handling system such as PACS. The system 10 can be configured with an image processor circuit or system 18 that can generate the desired image visualizations on one or more workstation displays 30$d$. The image processor circuit 18 can reside at least partially on a server 50. The server 50 can communicate with both short and long term storage 20, 40 and client workstations 30. The image processor system 18 can generate initial evaluation images using the short-term data set format from the short-term storage media 20 and later evaluation images using the long-term data set format of the same patient data set from the long-term storage media 40. The long-term data format can include a high-quality image data set and a low-quality image data set of a respective same patient data set.

Figure 3:
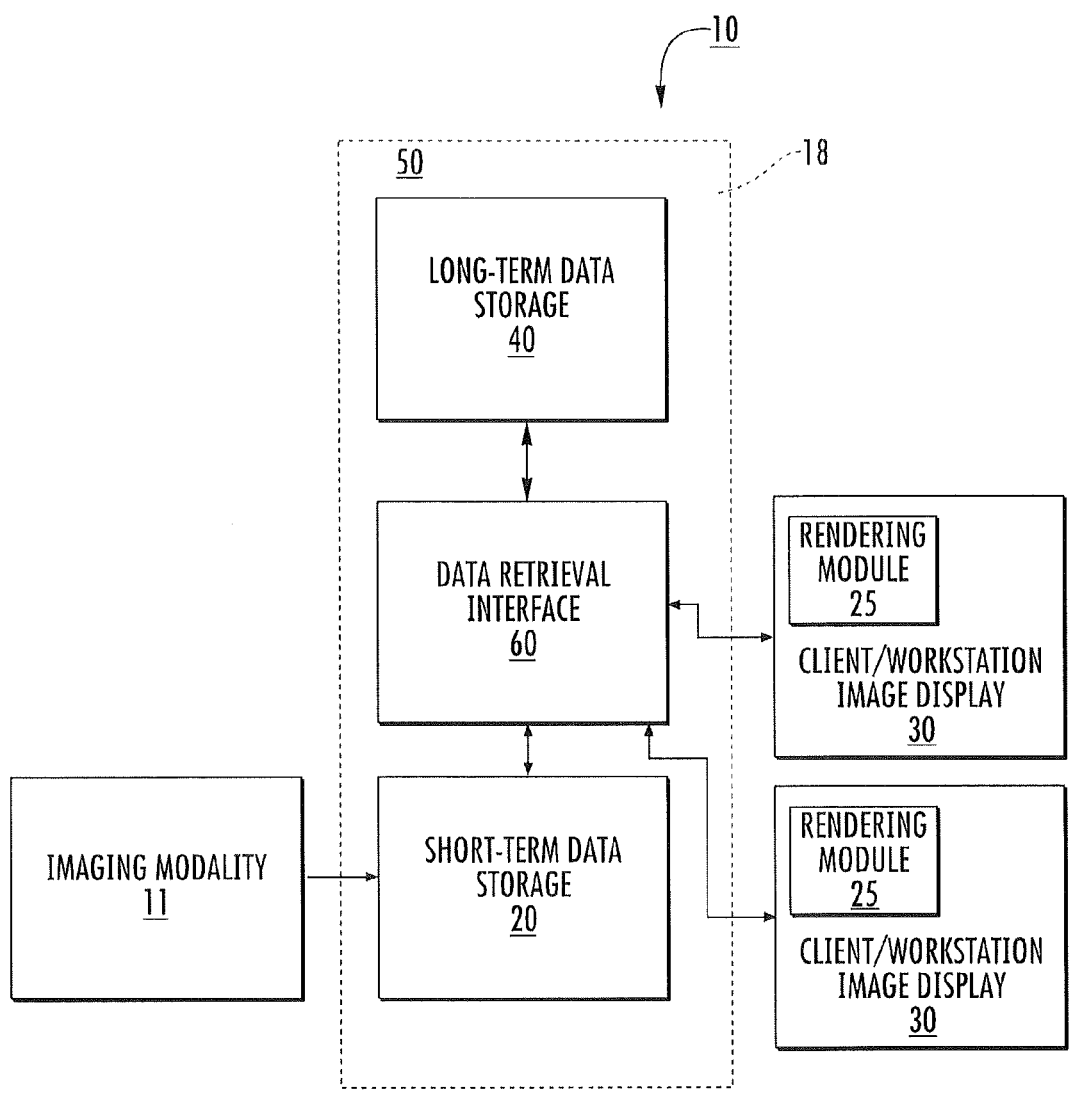
FIG. 3 is a schematic illustration of a medical imaging visualization system according to embodiments of the present invention.

FIG. 3 illustrates a system 10 that includes a data retrieval interface 60. The data retrieval interface 60 can reside at least partially on the server 50. The workstation 30 can include and/or be in communication with a rendering system 25. Although shown as residing on a common server 50, the long and short-term storage media 20, 40 and/or the data retrieval interface 60 can reside on different and/or separate servers.

The rendering system 25 can be in communication with the physician workstation 30 to allow user input (typically graphical user input ("GUI")) and interactive collaboration of image rendering to give the physician the image views of the desired features in generally, typically substantially, real time. The rendering system 25 can be configured to zoom, rotate, and otherwise translate to give the physician visualization of the patient data in numerous views, such as section, front, back, top, bottom, and perspective views. The rendering system 25 may be wholly or partially incorporated into the physician workstation 30, or can be a remote or local module (or a combination remote and local module) component or circuit that can communicate with a plurality of physician workstations (not shown). The visualization system can employ a computer network and may be particularly suitable for clinical data exchange/transmission over an intranet. As discussed above, a respective workstation 30 can include at least one display 30$d$ (and may employ two or more adjacent displays). The workstation 30 and/or rendering system 25 can form part of the image processor system 18 that includes a digital signal processor and other circuit components that allow for collaborative interactive user input using the display at the workstation 30. Thus, in operation, the image processor system 18 renders the visualization of the medical image(s) of patient data sets from either long and/or short term-storage formats using the medical image volume data, typically on at least one display at the physician workstation 30. In some embodiments, the image processor system 18 can generate side-by-side images of a recent evaluation of patient data in a short-term data set format (high quality) and at least one earlier, previous evaluation in a long-term high quality compressed format to allow comparison of patient images taken at different times to evaluate/confirm a proper diagnosis, therapeutic affect of a treatment(s), disease progression, anatomical or physiological changes and the like. In some embodiments, the full data set of the patient can be held in short-term storage so as to be accessible for data sampling, extraction, and retrieval, and both a low image quality compressed version of the patient data set and a high image quality compressed version of the respective patient data set can be held in long-term storage.

As shown in FIG. 3, each respective workstation 30 can be described as a client 30 that communicates with at least one (hub or remote) server 50 that stores the patient data sets or is in communication with the stored short and long term patient electronic multi-dimensional (e.g., volumetric) patient data files 20, 40. Additional numbers of clients 30 may be in communication with the server 50 and, as noted above, more than one server may be used to store patient data (either long and/or short term data). The data retrieval interface 60 can be used to communicate with the clients 30 and the stored data sets on and/or accessible via server 50. Some of the clients 30 can be local (within a common clinic or facility) and can access the data sets via a relatively broadband high speed connection using, for example, a LAN, while others may be remote and/or may have lesser bandwidth and/or speed, and for example, may access the data sets via a WAN and/or the Internet. Firewalls may be provided as appropriate for security.

For ease of discussion, the rendering module 25 and the data retrieval interface 60 are shown as a stand-alone module or circuit. However, the interface 60 and/or rendering module 25 be disposed partially on each client 30, partially or wholly on the server 50, or may be configured as a discrete rendering server and/or data retrieval interface server (not shown). The clients 30, server 50, rendering module 25 and/or interface 60 can each include a digital signal processor, circuit and/or module that can carry out aspects of the present invention. All or selected ones of the clients 30 can be online at the same time and may each repeatedly communicate with the data retrieval interface 60 to request volume image data.

In some embodiments, the data retrieval interface 60 can communicate with and extract relevant image data from a variety of multi-dimensional data sets in the stored data 40, 60. The multi-dimensional data sets can have different data arrangements or format types, can be from different imaging modalities, and can have multiple and different dimensions and one or more of the dimensions can be multi-variate dimensions.

Figure 4:
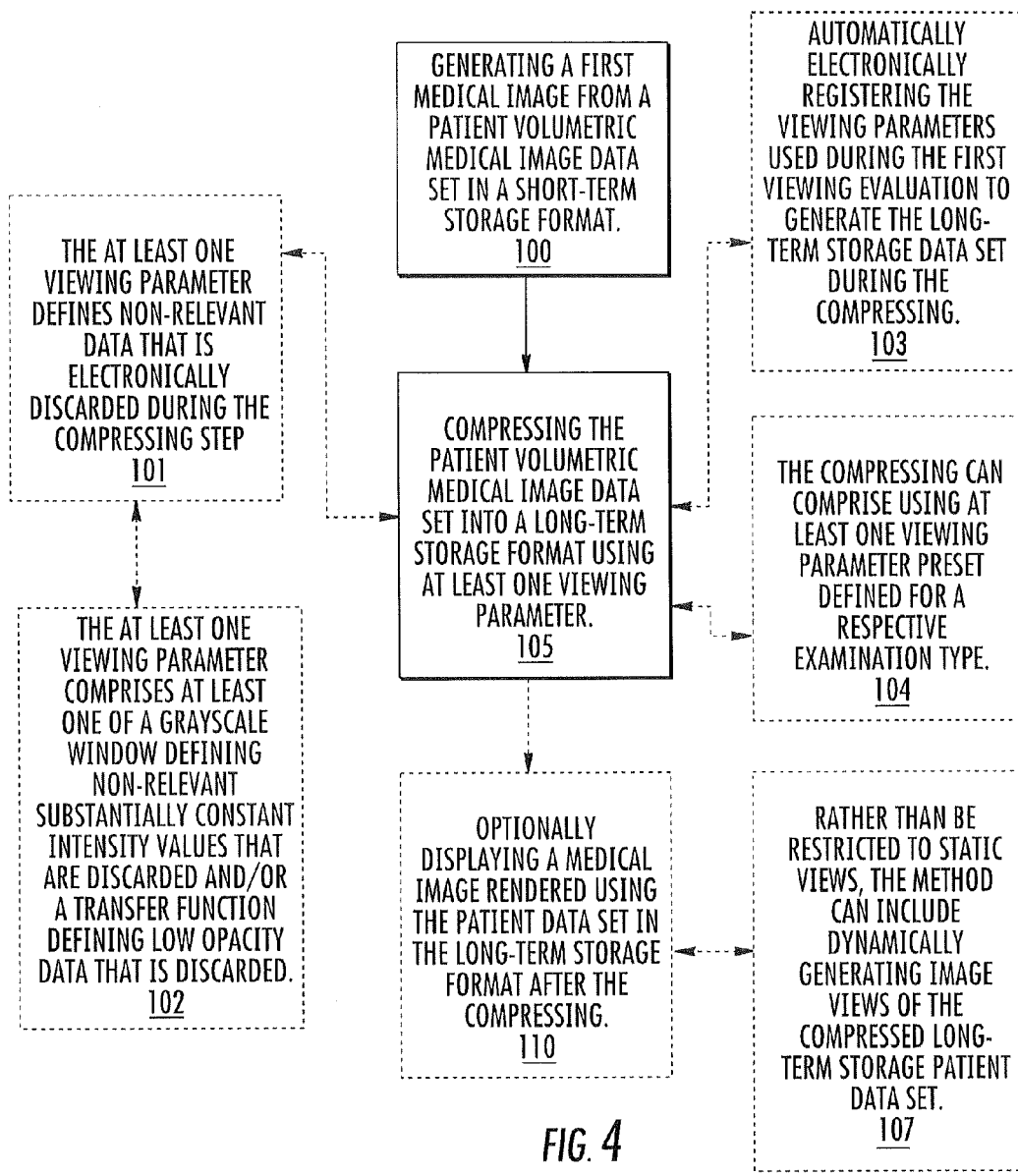
FIG. 4 is a flow chart of operations that can be performed to carry out embodiments of the present invention.

Turning now to FIG. 4, exemplary operations are illustrated that can be used to carry out and/or implement workflow protocols in image handling (and visualization) systems according to embodiments of the invention. The methods/systems can electronically automatically and/or semi-automatically compress data from a multidimensional medical data set for long-term storage. A first medical image from a patient multi-dimensional (e.g., volumetric) medical image data set in a short-term storage format is generated (block 100). The patient medical image data set is compressed into a long-term storage format using at least one viewing parameter (block 105). Optionally (although useful in a number of situations), a medical image rendered using the patient data set in the long-term storage format can be displayed after the compression step using the (high-precision) compressed data set (block 110).

The at least one viewing parameter can define non-relevant data that is electronically discarded during the compression step (block 101). The at least one viewing parameter can comprise at least one of a grayscale window defining non-relevant substantially constant intensity values that are discarded and/or a transfer function defining low opacity data that is discarded or a time-series parameter (block 102).

Settings associated with the viewing parameters used during a first or initial viewing evaluation by a clinician can be automatically registered and used to generate the compressed long-term data storage set (block 103). For example, multiple images with different views can be visualized on a display at a workstation during a first viewing evaluation, the different views having associated viewing parameters. Then the viewing parameters used during the first viewing evaluation can be automatically electronically registered to generate the long-term storage data set during the compression step (so that data for these views are saved in high-image quality format). A medical image can be rendered and visualized using the patient long term storage data set after the compressing and registering steps during a second viewing evaluation to thereby provide a recreation of an image from long term storage with the same or substantially the same image quality and resolution. This technique can be carried out so that during the first and second viewing evaluations of corresponding images of clinically relevant features, image quality is substantially the same. Stated differently, the data reduction or compression can be carried out by saving data used with viewing parameters actually used to evaluate the initial data set image(s) so that subsequent viewings can be displayed at full quality in all versions it has previously been displayed.

Alternatively, or additionally, the compressing can be carried out using at least one viewing parameter preset defined for a respective examination type (block 104). For example, multiple images with different views can be visualized on a display at a workstation during a first viewing evaluation, the different views having associated viewing parameters. Then, at least one static preset for an examination type associated with the patient data set, can be automatically used to generate the long-term storage data set during the compressing step. The at least one static preset can be a single one or the union of a group of presets. The term "static preset" refers to a template or pre-defined TF for an examination type. In some situations, a small number of presets may be routinely used for a certain examination type, both for grayscale windows and Transfer Functions. A medical image can be rendered/visualized using the patient long term storage data set after the compressing and applying preset steps during a second viewing evaluation. This technique can also be carried out so that during the first and second viewing evaluations of corresponding images of clinically relevant features, image quality is substantially the same. Combinations of the static presets and automatic registration protocols can be used.

Although some resolution and/or image quality penalty may occur, the system can be configured to allow viewing parameter changes used to render images from the compressed long-term data set.

In some embodiments, rather than be restricted to static views of patient images from the long-term storage data sets, the long-term storage compressed data sets can be configured to allow dynamically generated image views of the compressed long-term storage patient data set (block 107). The dynamic evaluation can comprise, for example, at least one of the following: rotating (freely) the compressed long-term storage data set; employing cut planes; and recoloring a data range in at least one image view.

Figure 5:
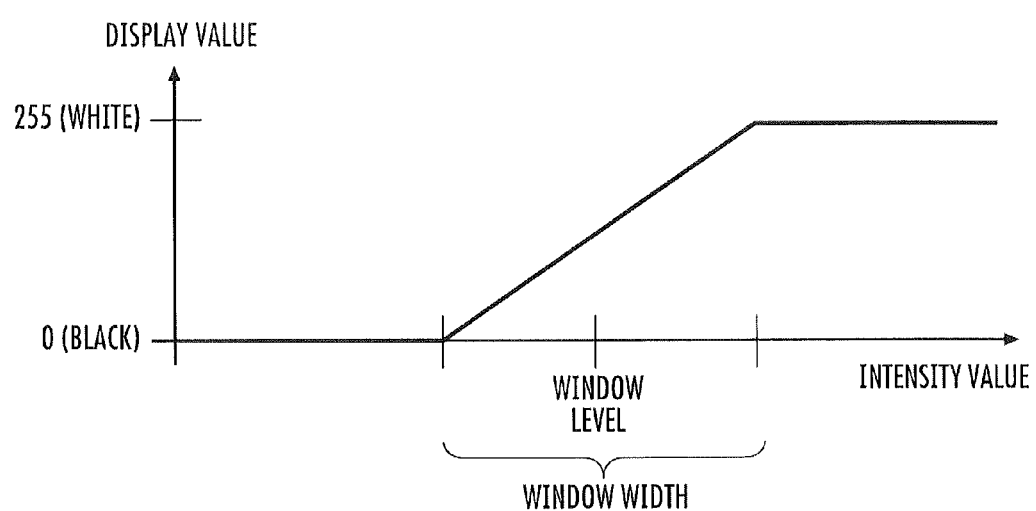
FIG. 5 is a block diagram of a medical visualization system according to embodiments of the present invention.

Regarding viewing parameters, in the traditional slice-by-slice viewing in grayscale, one or several grayscale windows are applied to transform the intensity values of the data set to a grayscale value typically displayed on the screen. The transformation is typically linear and expressed in terms of window width and level, as shown for example, in FIG. 5. For a specific window setting, the value ranges where the window is constant (either black or white) can be degenerated into a single value. For example, if all values below 1000 are shown as black, the values below 1000 can be set to "0" without impacting the image shown, while this data simplification reduces the number of required bits per data set point.

A similar simplification can be made in the case of DVR. In DVR, the visual appearance is controlled by Transfer Functions, typically mapping each intensity value to opacity and a color. Portions of the data, potentially large portions of the data, can be rendered as transparent (zero opacity). Discarding transparent data can allow a relatively significant data reduction while retaining substantially full or full image quality. The technique may also be expanded to discard very low, nearly transparent data with the transparent data.

The grayscale window and the Transfer Function are the main viewing parameters to use for data reduction, but other viewing parameters may also or alternatively be used. For example, if the DVR display is restricted to certain viewing angles, obscured regions can be removed from the data set. In some embodiments, a manual cropping or segmentation of the data set can be performed and this information can be used for data reduction. It is also noted that one or more viewing parameters associated with time-series viewing of 2-D and 3-D images can also be used. One example of 2-D time series images is an angiography studying the flow of contrast fluid in the vessels. An example of 3-D time series images is a CT heart study showing a beating heart. So, in addition to or alternatively to TF and/or grayscale window that can be used for data reduction, there are viewing parameter(s) associated with the time-dimension: choice of flow visualization type, color/opacity mapping of velocity making certain data insignificant, etc.

It is noted that once data reduction based on viewing parameters has been performed, applying other viewing parameters can result in less than "full" quality images. However, using one or more of the preset and automatic registration of viewing parameters can inhibit subsequent suboptimal visualization of clinically relevant features because the data reduction/compression for preset/registration methods can preserve data for those views evaluated during a first viewing so that after compression and long-term storage those views will still be able to be rendered as full quality images.

Even though there may be some viewing parameters that are unavailable at full quality after data reduction, other viewing parameters are not affected. For example, having restricted the intensity range in a DVR application, it is still possible to rotate the data set freely, to use cut planes and even to recolor a range in question. Thus, the proposed data reduction can allow increased freedom over a static sequence that still images provide. Such sequences, for example a "film" of DVR renderings from a data set from different angles has been used in the past in an attempt to retain some full quality images when the full resolution is no longer available. That is, generally stated, conventionally a number of still DVR images are created, for instance at certain angles in a rotation around the vertical axis (for example 8 images 45 degrees apart). For the situation where the data set is heavily compressed, subsequent DVR will be of poor quality. There are the still images, which may provide acceptable visualization if the viewing angles are restricted to the stored ones. However, if one needs a view at another angle that the stored ones, it cannot be obtained. Advantageously, using embodiments of the instant invention, the full 3-D model is available at the given TF. Free rotation is supported and an arbitrary view angle can be applied. Free rotation may be able to allow depth perception in a 3-D rendering.

Many types of existing compression methods can be used to achieve the data reduction. See, e.g., co-pending and co-assigned WO2005/104037 entitled "A Method For Reducing The Amount of Data To Be Processed in a Visualization Pipeline", which describes compression methods. The contents of this document are hereby incorporated by reference as if recited in full herein. The compression can be supported by the Digital Imaging and Communications in Medicine (DICOM) standard for distributing and viewing any kind of medical image regardless of the origin. Limiting the value range can be a straightforward reduction of the bits per sample or used to enhance the effect of an entropy-encoding scheme such as Huffman coding. See, D. A. Huffman, *A method for the construction of minimum redundancy codes*, Proceedings IRE, Vol. 40, pp 1098-1101 (September 1952). Other standard compression schemes, e.g., based on wavelet techniques can also benefit from this data simplification. The wavelet compression is the base of the JPEG 2000 standard, such as described at URL jpeg.org/jpeg2000. For a visualization perspective, see Guthe et al., *Interactive Rendering of large volume data sets*, Proceedings IEEE Visualization 2002, pp. 53-60 (2002). In some embodiments, data reduction schemes that employ a spatial subdivision of the data set can completely discard insignificant regions (low or zero opacity or intensity greater or lesser than a visible value, e.g., such as the "1000" number for black intensity described above). See, Ljung et al., *Transfer Function based adaptive decompression for volume rendering of large medical data sets*, Proceedings IEEE Volume Visualization and Graphics Symposium, pp. 25-32 (2004).

The compression technique can comprise lossless compressions or lossy compressions or combinations thereof. In some embodiments, the data compression can be carried out with lossless compression for significant data and to discard insignificant data to thereby retain substantially full image quality of features associated with the significant data. To achieve even higher compression ratio while retaining good quality (but not full quality), the viewing parameters can be used to tailor a lossy compression of the significant data. A less strict approach may also be used, where some of the insignificant data can be retained by applying a lossy compression to some of the insignificant data. This may allow changes of the viewing parameters for the reduced data set, without extensive or undue loss of image quality. Thus, in some embodiments, the data compression can be carried out with a lossy compression of significant and/or insignificant data.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In some embodiments, some program code may execute on local computers and some program code may execute on one or more local and/or remote server. The communication can be done in real time or near real time or off-line using a volume data set provided from the imaging modality.

The invention is described in part with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
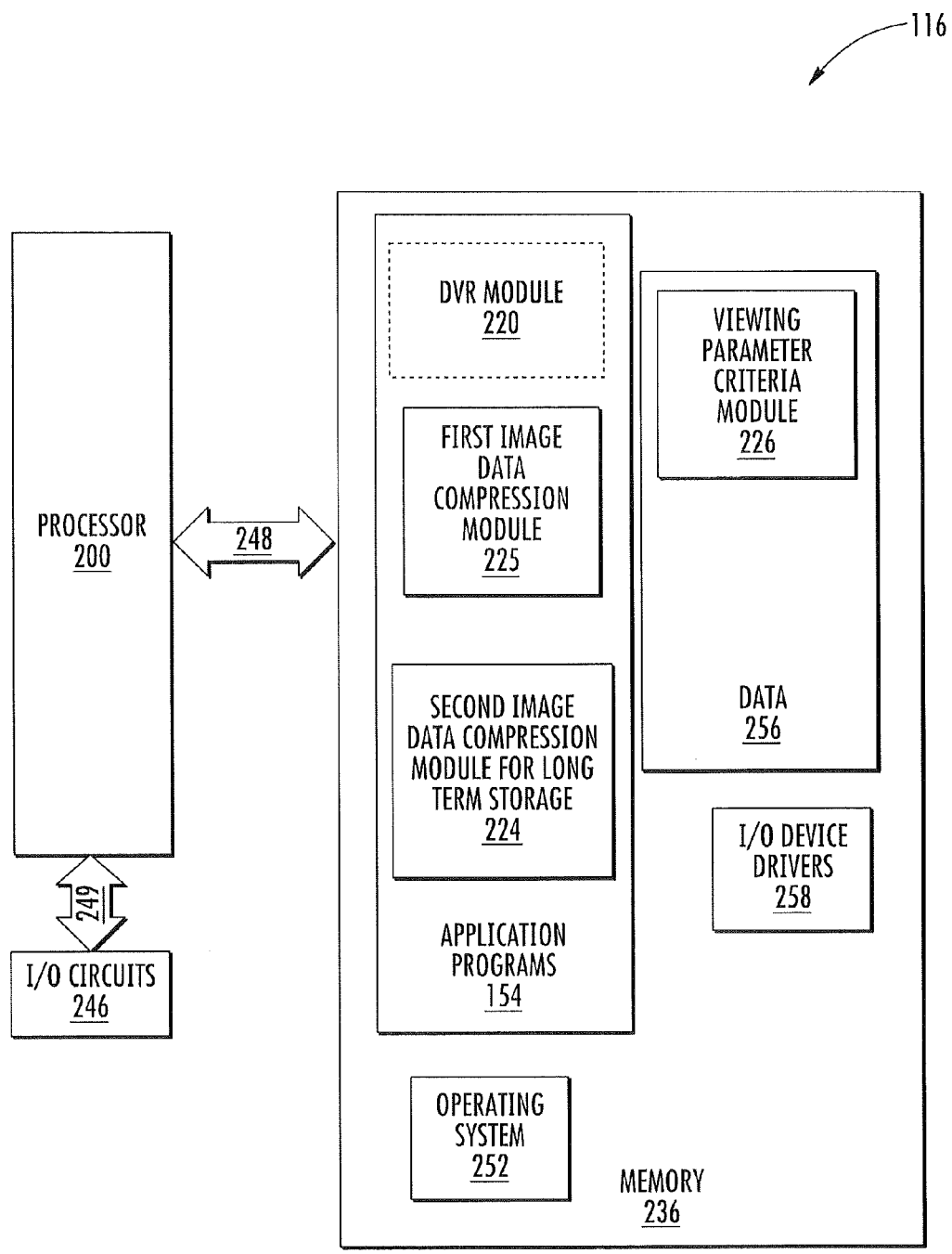
FIG. 6 is a block diagram of a data processing system according to embodiments of the present invention.

As illustrated in FIG. 6, embodiments of the invention may be configured as a data processing system 116, which can be used to carry out or direct operations of the rendering, and can include at least one processor circuit 200, a memory 236 and input/output circuits 246. The data processing system may be incorporated in, for example, one or more of a personal computer, workstation, server, router or the like. The system 116 can reside on one machine or between a plurality of machines. The processor 200 communicates with the memory 236 via an address/data bus 248 and communicates with the input/output circuits 146 via an address/data bus 249. The input/output circuits 246 can be used to transfer information between the memory (memory and/or storage media) 236 and another computer system or a network using, for example, an Internet protocol (IP) connection. These components may be conventional components such as those used in many conventional data processing systems, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk.

In some embodiments of the present invention, the memory 236 may be a content addressable memory (CAM).

As further illustrated in FIG. 6, the memory (and/or storage media) 236 may include several categories of software and data used in the data processing system: an operating system 252; application programs 154; input/output device drivers 258; and data 256. As will be appreciated by those of skill in the art, the operating system 252 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application programs 154 to communicate with devices such as the input/output circuits 246 and certain memory 236 components. The application programs 154 are illustrative of the programs that implement the various features of the circuits and modules according to some embodiments of the present invention. Finally, the data 256 represents the static and dynamic data used by the application programs 154 the operating system 152 the input/output device drivers 258 and other software programs that may reside in the memory 236.

The data 256 may include (archived or stored) digital image data sets (short and/or long term formatted data sets) that provide stacks of image data correlated to respective patients and may include a Viewing Parameter Criteria Module 226. As further illustrated in FIG. 6, according to some embodiments of the present invention application programs 154 include one or more of: a first Image Data Compression Module 224, and a second Image Data Compression Module 225. One Data Compression Module may more severely compress the data and/or generate images with lower image quality. The application programs may also include a DVR Module 220 which may be decoupled or isolated from the First or Second Modules 224, 225. The application program 154 may be located in a local server (or processor) and/or database or a remote server (or processor) and/or database, or combinations of local and remote databases and/or servers.

While the present invention is illustrated with reference to the application programs 154, 224, 225 in FIG. 6, as will be appreciated by those of skill in the art, other configurations fall within the scope of the present invention. For example, rather than being application programs 154 these circuits and modules may also be incorporated into the operating system 252 or other such logical division of the data processing system. Furthermore, while the application program 154 is illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 6 but may be provided by other arrangements and/or divisions of functions between data processing systems. For example, although FIG. 6 is illustrated as having various circuits and modules, one or more of these circuits or modules may be combined or separated without departing from the scope of the present invention.

The present invention is explained in greater detail in the following non-limiting Example.

EXAMPLES

Figure 7:
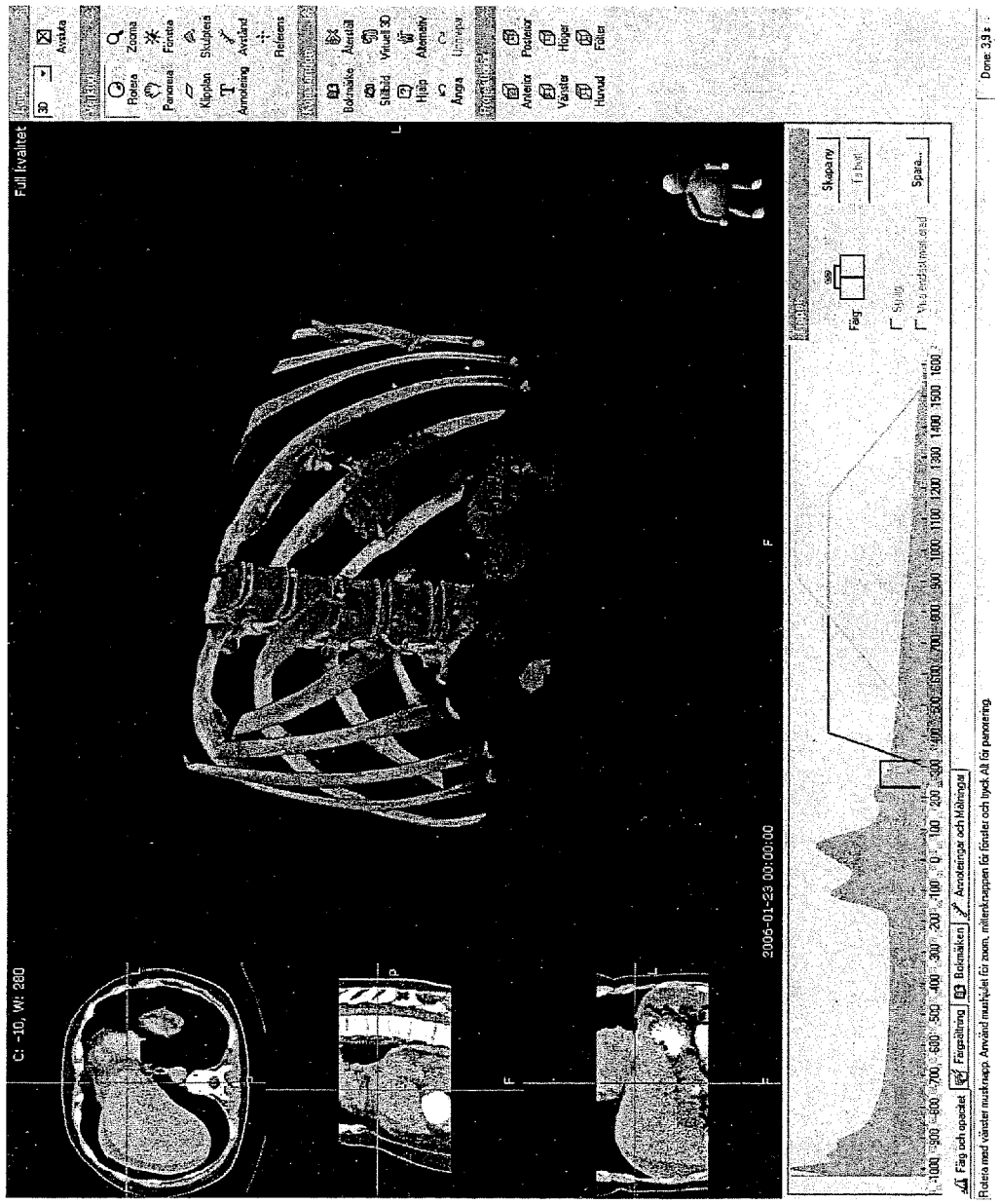
FIGS. 7-11 are black and white copies of screen shots of rendered medical images according to embodiments of the invention.

FIGS. 7-11 are black and white copies of screen shots of medical images using viewing parameters to generate compressed image data sets. Typically, the rendered image will have color and opacity values. FIG. 7 illustrates a 3-D view in a medial portion of the screen shot. To the right are reference slices in three major planes. At the bottom is a histogram with the TF control. As shown, a large part of the value range becomes invisible (everything but bone), there is no TF trapezoid in the lower half. Thus, the data set can be highly compressed assuming this TF will be used in the future as well.

FIG. 7 is a "pre-storage" image, with this "bones TF" as viewing parameter. Since the compression would be optimized for this TF, the image would look the same after storage, so this image can be used as "after storage" as well.

Figure 8:
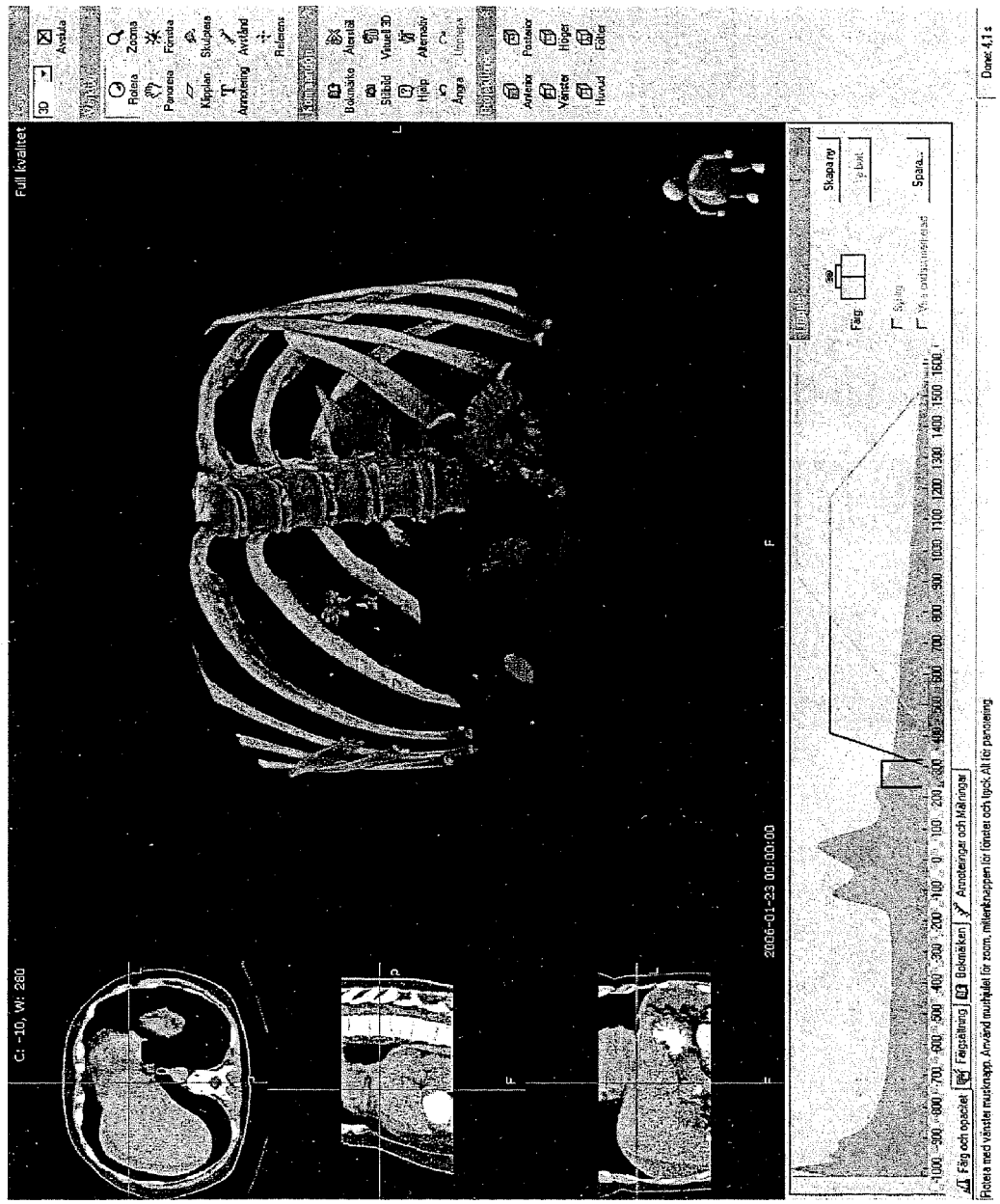

FIG. 8 is a screen shot that illustrates that a "post-storage" reconstructed image can be generated in a manner that retains full quality even though the data set is rotated.

Figure 9:
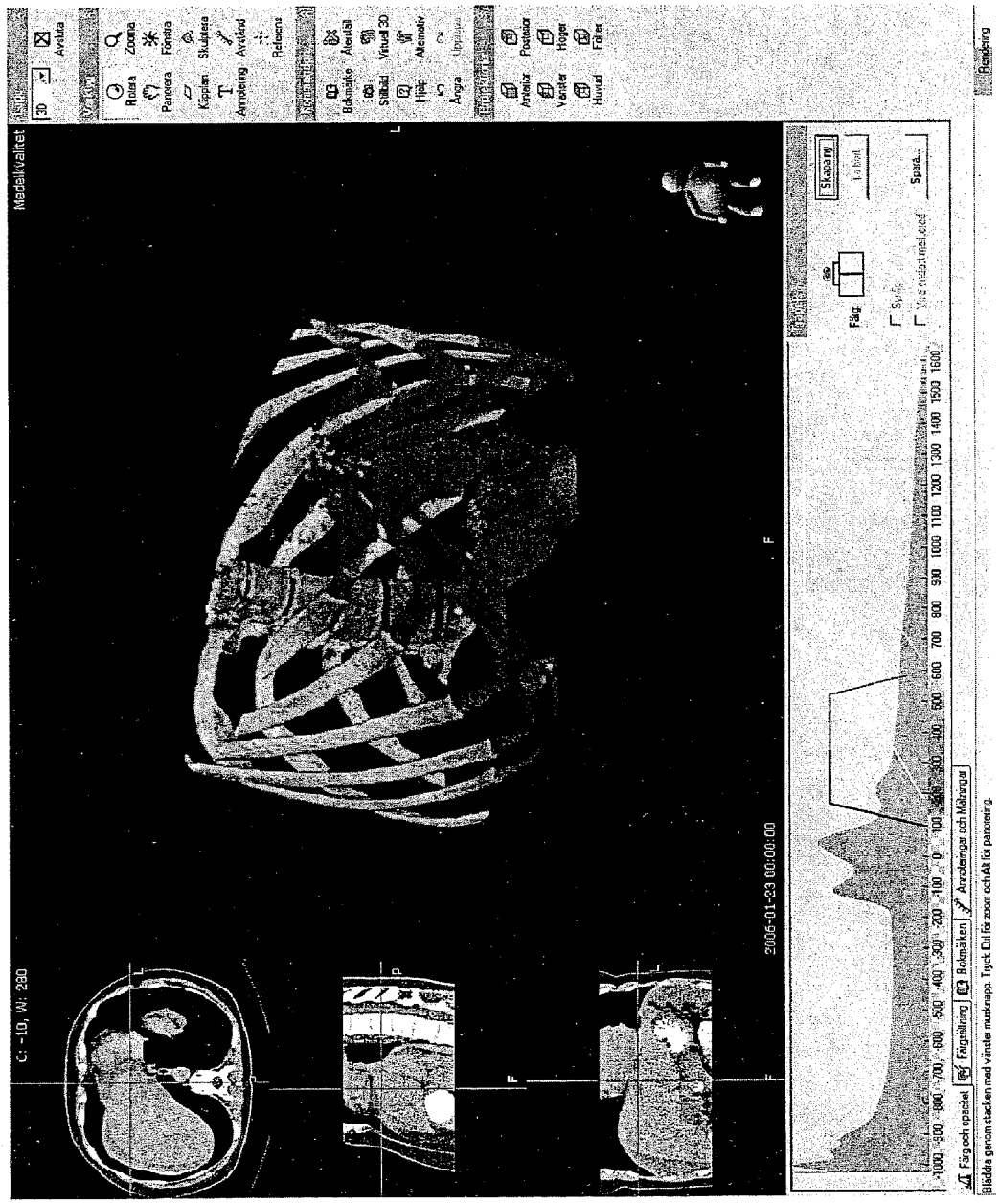

FIG. 9 is an image with slightly lower quality (e.g., vertical line artifacts in the ribs), which illustrates that changing viewing parameters "post-storage" typically results in lower quality.

Figure 10:
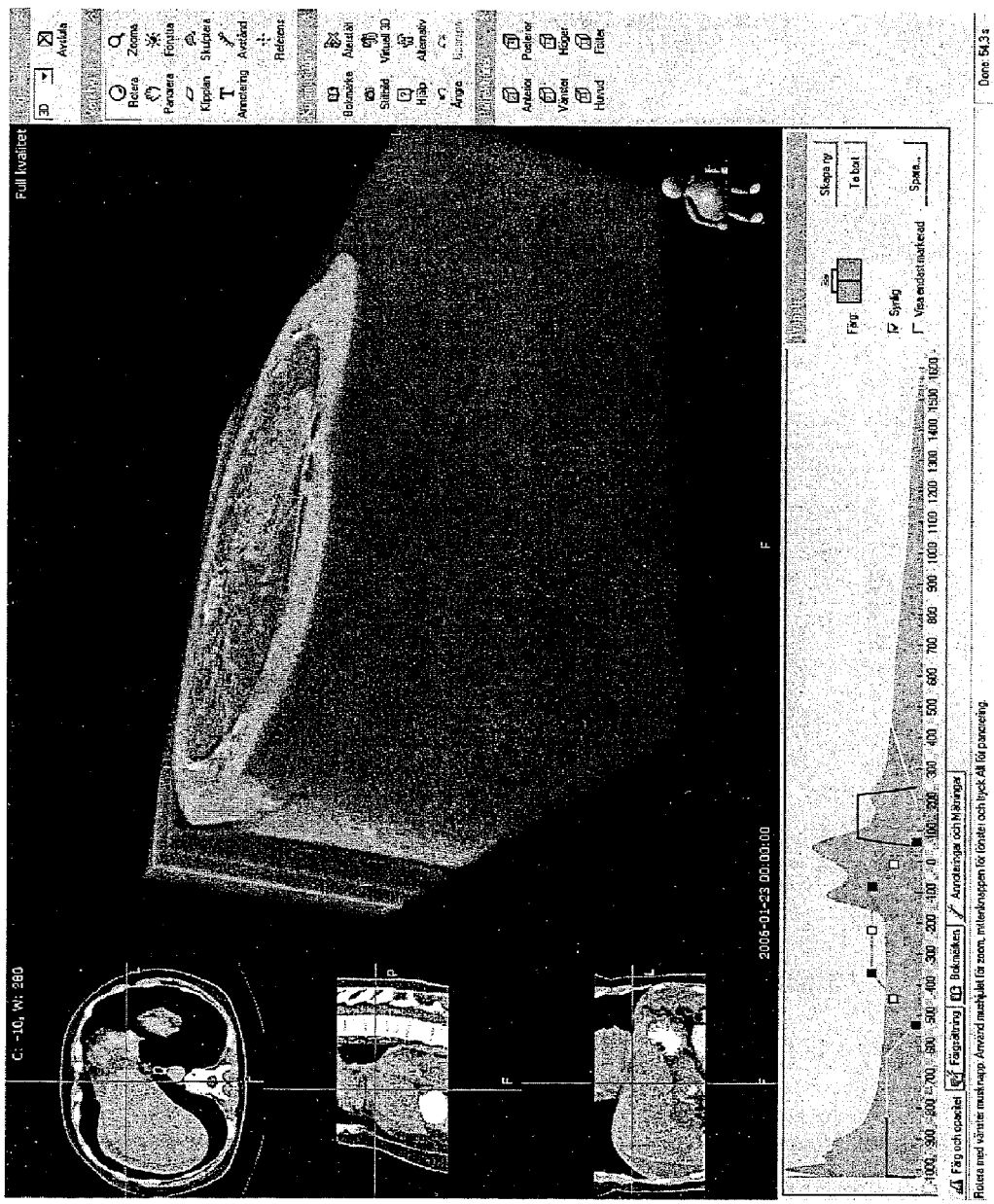

FIG. 10 illustrates that the whole value range is not used in volume rendering. If no voxels are invisible, the rendered image is typically extremely cluttered and useless. Invisible value ranges allows high compression, as described above.

Figure 11:
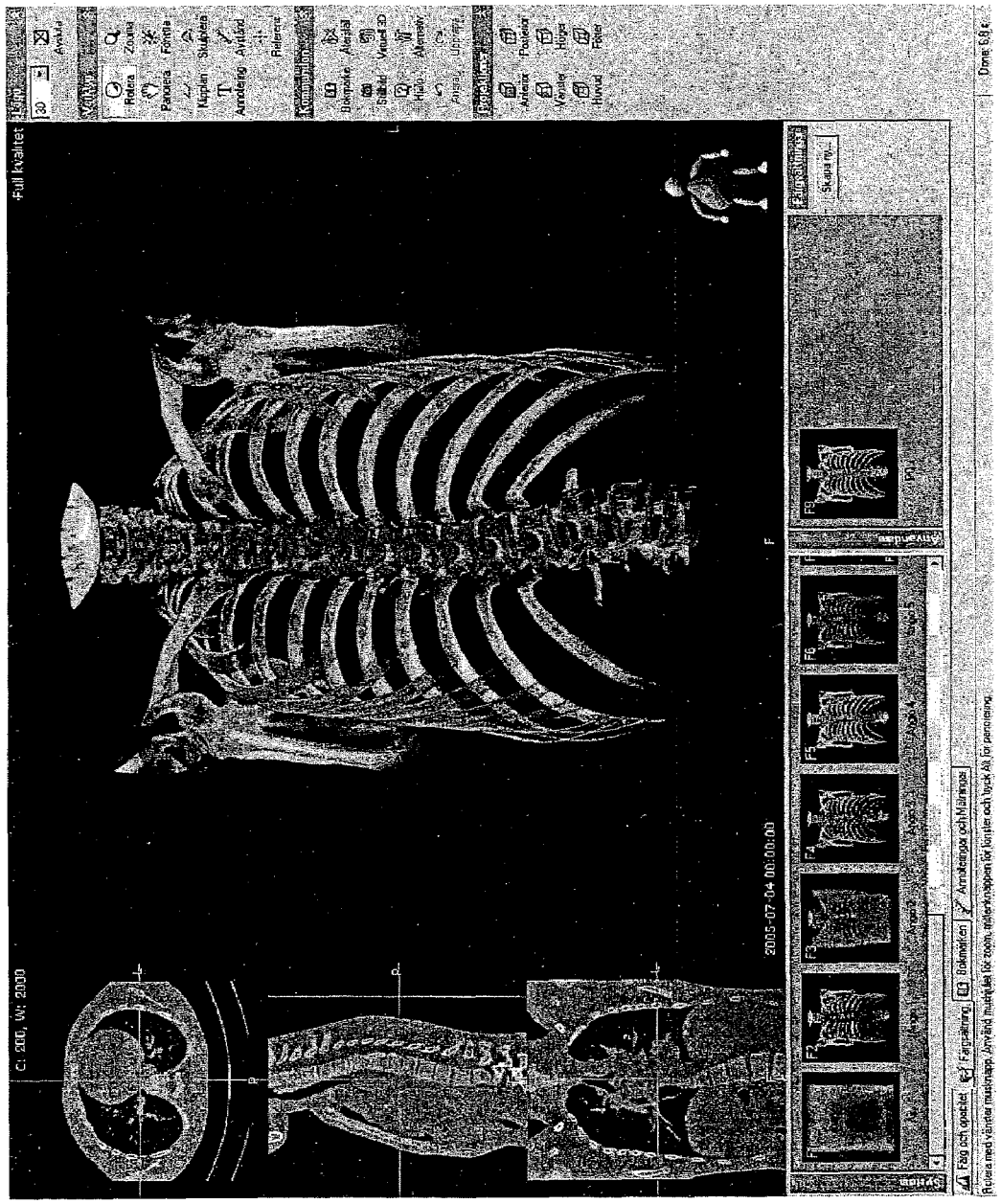

FIG. 11 shows an example of the static preset control (the thumbnail templates low left), as an alternative to the TF control.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method for electronically compressing data from a multidimensional medical data set for long-term storage, comprising:
generating a first medical image from a patient multi-dimensional medical image data set in a short-term storage format, wherein the multi-dimensional medical image data set is defined as a number of grid points in G dimensions, where there is a V number of values in each grid point with $V \geq 1$, and wherein the medical image data set has G and V values of $G \leq 4$ and $V \leq 6$; and
compressing the patient medical image data set into a long-term storage format using at least one viewing parameter, wherein the at least one viewing parameter defines non-relevant or less relevant data that is electronically discarded or given a simplified representation during the compressing step, and wherein the at least one viewing parameter comprises at least one of the following:
a grayscale window;
a transfer function;
a time-dimension parameter for time-series images;
a viewing angle; and
a manual cropping/segmentation.

2. A method according to claim 1, the method further comprising displaying a medical image rendered using the patient data set in the long-term storage format after the compressing step, and wherein the medical data sets have G and V values of at least one of: (i) G=3 and V=1; (ii) G=4 and V=1, representing a time-dependent volume; or (iii) G=3 and V=3, representing a volume describing flow (V has three values, since velocity is a 3D vector).

3. A method for electronically compressing data from a multidimensional medical data set for long-term storage, comprising:
generating a first medical image from a patient multi-dimensional medical image data set in a short-term storage format;
compressing the patient medical image data set into a long-term storage format using at least one viewing parameter,
generating multiple images with different views on a display at a workstation during a first viewing evaluation, the different views having associated viewing parameters; then
automatically electronically registering the viewing parameters used during the first viewing evaluation to generate the long-term storage data set during the compressing step; and
rendering a medical image using the patient long-term storage data set after the compressing and registering steps during a second viewing evaluation.

4. A method according to claim 3, wherein image quality during the first and second viewing evaluations of corresponding images of clinically relevant features is substantially the same.

5. A method according to claim 1, wherein the compression step comprises using at least one viewing parameter preset defined for a respective examination type.

6. A method according to claim 1, wherein the viewing parameters used for compression can be predefined or manually set during image visualization.

7. A method according to claim 1, further comprising automatically electronically defining the viewing parameters used for compression based on at least one static preset, wherein image quality of clinically relevant features in images rendered using the compressed long-term data set is substantially the same as images rendered during a prior valuation using an original data set.

8. A method according to claim 1, further comprising electronically storing both a second version of the patient data set and the first compressed version of the long-term storage patient data set in long-term storage, the second version having less compression than the first long-term storage data set.

9. A method according to claim 1, wherein the method further comprises generating a second medical image using the compressed long-term storage data set after the compressing step, wherein the first and second images are generated using direct volume rendering.

10. A method according to claim 9, further comprising dynamically generating image views of the compressed long-term storage patient data set using at least one of the following:
rotating the compressed long-term storage data set;
employing cut planes; and
recoloring a data range in at least one image view.

11. A method according to claim 1, wherein the compression step is carried out with lossless compression for significant data and to discard insignificant data to thereby retain substantially full image quality of features associated with the significant data.

12. A method according to claim 1, wherein the compression step is carried out with a lossy compression of data.

13. A method according to claim 12, further comprising changing viewing parameters used to render images from the compressed long-term data set.

14. A computer program product comprising a non-transitory computer readable medium encoded with a program for use in a processing device, the program, when executed, performs operations to carry out the method of claim 1.

* * * * *